US007173616B2

(12) United States Patent
Boekhorst

(10) Patent No.: US 7,173,616 B2
(45) Date of Patent: Feb. 6, 2007

(54) METHOD FOR DETERMINING THE BOUNDING VOXELISATION OF A 3D POLYGON

(75) Inventor: Martijn Boekhorst, Nieuwegein (NL)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 11/015,502

(22) Filed: Dec. 20, 2004

(65) Prior Publication Data

US 2005/0151735 A1    Jul. 14, 2005

(30) Foreign Application Priority Data

Dec. 20, 2003 (GB) ................... 0329534.2

(51) Int. Cl.
*G06T 15/00* (2006.01)
(52) U.S. Cl. ............... 345/424; 345/419; 382/128; 382/131
(58) Field of Classification Search ............ 345/424, 345/419, 422, 619; 382/128, 131
See application file for complete search history.

(56) References Cited

U.S. PATENT DOCUMENTS 6,674,430 B1 * 1/2004 Kaufman et al. ........... 345/419

6,894,689 B1 * 5/2005 Greene et al. ............. 345/422
7,109,989 B2 * 9/2006 Bissell et al. .............. 345/424

OTHER PUBLICATIONS

M. W. Jones; "The Production of Volume Data from Triangular Meshes Using Voxelisation", Blackwell Publisher, vol. 15, Nov. 1996, pp. 311-318.
Andrew Woo; Ray Tracing Polygons Using Spacial Subdivision, IEEE Computer graphics & Application, May 1992, pp. 1-8.
R. Westermann et al.; "Decoupling Polygon Rendering from Geometry Using Rasterization Hardware" Rendering technique, 1999, pp. 45-56.
R. Tiwari et al.; "A Distributed Memory Algorithm for Volume Rendering", IEEE, May 1994, Scalable High Performance Computing Conference, pp. 247-251.

* cited by examiner

*Primary Examiner*—Phu K. Nguyen
(74) *Attorney, Agent, or Firm*—Whitham, Curtis, Christofferson & Cook, PC

(57) ABSTRACT

Bounding voxelization of a triangle or other polygon represented in a three-dimensional space is determined by dividing the triangle or polygon into polygons, each being an intersected slice of a grid. Each polygon is rasterized individually to determine an intersection of each edge with voxels on the defined slice for a given axis position. Strips of the voxels are marked iteratively using minimum and maximum voxel positions along a secondary axis for a tertiary axis.

20 Claims, 8 Drawing Sheets

METHOD FOR DETERMINING THE BOUNDING VOXELISATION OF A 3D POLYGON

FIELD OF THE INVENTION

The present invention relates generally to computer graphics and, in particular, to methods and engines for rendering a digital image using ray-tracing.

BACKGROUND OF THE INVENTION

Ray-tracing is a field of computer graphics techniques that can produce superior, photorealistic digital images. Ray-tracing or ray-casting is a three-dimensional (3-D) rendering technique that determines the location of an object in 3-D and calculates shadows, reflections, and hidden surfaces based on lighting conditions and locations, as well as material characteristics. The visibility of surfaces is determined by tracing rays of light from the viewer's vantage to objects in a scene.

Ray-tracing differs from z-buffer oriented methods by being ray centric, as opposed to primitive centric. Instead of drawing primitives to a screen, rays are cast from a virtual eye, or center of projection, through screen pixels (i.e., a view plane) to find intersecting primitives for those pixels. Each pixel has a color set to that of the primitive at the closest point of intersection. While ray-tracing has existed for quite some time, only recently has research started to make ray-tracing algorithms run in real time. Current applications for ray-tracing include movie and advertising business for precalculated visualizations.

Interactive and real time ray-tracing are closely related areas, but are not quite the same. "Interactive" refers to the ability to compute scenes at real time speeds, without prior knowledge of future frames (e.g., a user may be able to control scene content directly). "Real time" refers to the ability to compute scenes at speeds sufficiently high to convey the perception of motion to the human eye and allowing an algorithm with knowledge of future frames (more of a prescripted movie approach to animation).

Fujimoto, A., Tanaka, T., and Iwata, K., "ARTS: Accelerated Ray-Tracing System", IEEE CG&A, April 1986, pp. 16–26, and hereby fully incorporated by reference, describe a three-dimensional digital differential analyzer (3DDDA) that seeks to address issues of speed and aliasing in ray-tracing. The 3DDDA is a 3D line generator for traversing a data structure describing a 3D environment to identify the intersections between rays and objects in the image to be generated. The 3DDDA identifies cells pierced by a ray or straight line and generates the coordinates of the cells. One implementation of a 3DDDA is to use two DDAs synchronized to work in mutually perpendicular planes that intersect along a driving axis DA (i.e., a coordinate axis). In each plane, the respective DDA follows the projection of the 3-D line onto that plane. The coordinate corresponding to the driving axis DA of each DDA is unconditionally incremented by one unit, where the slope of the line determines DA. A control term (or error term) for each DDA measured perpendicular to the DA is updated; this is done by subtracting from the control term the slope value and determining if it satisfies a stipulated condition. Both control terms are measured against the same DDA. If the test fails, a unit increment or decrement of the coordinate perpendicular to the DA is performed for the DDA. The control term is corrected by adding the value corresponding to one pixel whenever underflow occurs.

In a variety of applications such as ray-tracing and radiosity, the intersection of a three-dimensional (3D) triangle with a regularly spaced three-dimensional (3D) grid is needed. Those skilled in the art will appreciate a plurality of other applications to which determination of the intersection of a triangle (or other polygonal shape) with a 3D grid may apply. It should be appreciated, however, that, in general and for ray-tracing and radiosity in particular, determination of the intersection of a triangle with a 3D grid is most often encountered for the simple reason that a triangle provides a relatively more simple mathematical construct than other polygons while a surface of any arbitrary shape may be approximated by contiguous triangles. For example, in the field of ray-tracing, this determination is used to computationally efficiently determine the intersection of a ray within a set of triangles. Only those triangles that intersect one or more of the volume elements or voxels that a ray intersects need to be considered for intersection with that same ray. A voxel in this context is one individual cell of a three-dimensional (3D), regularly spaced grid.

Given the large number of triangles that are typically needed to describe in detail a three-dimensional scene of some realism, the computational efficiency of the three-dimensional triangle bounding voxelisation process is crucial. In particular, known techniques for determination of geometric shapes such as triangles or their boundaries has required numerous division operations which are particularly computation intensive and require multiple processing cycles as contrasted with addition, subtraction and multiplication which may often be completed in a single processing cycle. Accordingly, extreme processing power is required to perform such techniques at sufficient speed to approach real time or interactive generation of high-quality graphics. While some acceleration of processing can often be achieved using special purpose hardware such as application specific integrated circuits (ASICs) or field programmable gate arrays (FPGAs), possibly in combination with general purpose processors, the number of processing operations required to perform division at sufficient speeds for real time or interactive performance makes such hardware extremely complex and expensive to develop and fabricate.

DISCLOSURE OF THE INVENTION

It is therefore an object of the present invention to provide a technique for determining the intersection of a triangle or other polygon with a three-dimensional grid of voxels which can be performed at speeds sufficient for real time or interactive graphics generation using processors of modest processing power and/or simplified special purpose hardware.

It is another object of the invention to provide a technique for determining the intersection of a triangle or other polygon boundary with a grid of voxels which does not require division and supports voxels or pixels representing them to be defined by rapidly executed fill algorithms.

In accordance with an aspect of the invention, there is provided a method for determining the bounding voxelization of a triangle in a three-dimensional space. The method comprises the steps of: dividing a triangle into a plurality of polygons, each being an intersected slice of a grid; rasterizing each polygon individually to determine an intersection of each edge with voxels on the defined slice for a given axis position; and marking strips of the voxels iteratively using minimum and maximum voxel positions along a secondary axis for a tertiary axis. At least one of the polygons may be trapezoid-like. Preferably the present invention provides a method may further comprise the step of ordering the three vertices of the triangle.

Preferably the present invention provides a method comprising the step of verifying each coordinate of the three edges of the triangle for mathematical robustness. The method may further comprise the step of performing a digital differential analyzer (DDA) setup for the edges of the triangle and a slicing edge.

Preferably the present invention provides a method comprising the step of computing the number of voxel transitions for each of the three edges of the triangle.

Preferably the present invention provides a method comprising the step of iterating all voxels for the trapezoid-like polygon slice.

In accordance with another aspect of the invention, there is provided an apparatus for determining the bounding voxelization of a triangle in a three-dimensional space. The apparatus comprises: means for dividing a triangle into a plurality of polygons, each being an intersected slice of a grid; means for rasterizing each polygon individually to determine an intersection of each edge with voxels on the defined slice for a given axis position; and means for marking strips of the voxels iteratively using minimum and maximum voxel positions along a secondary axis for a tertiary axis.

In accordance with still another aspect of the invention, there is provided a computer program product comprising a computer readable medium having recorded therein a computer program for determining the bounding voxelization of a triangle in a three-dimensional space. The computer program product comprising: computer program code means for dividing a triangle into a plurality of polygons, each being an intersected slice of a grid; computer program code means for rasterizing each polygon individually to determine an intersection of each edge with voxels on the defined slice for a given axis position; and computer program code means for marking strips of the voxels iteratively using minimum and maximum voxel positions along a secondary axis for a tertiary axis.

BRIEF DESCRIPTIONS OF THE DRAWINGS

Embodiments of the invention are described below in detail, by way of example, with reference to the accompanying drawings in which.

DETAILED DESCRIPTION OF THE INVENTION

Figure 1:
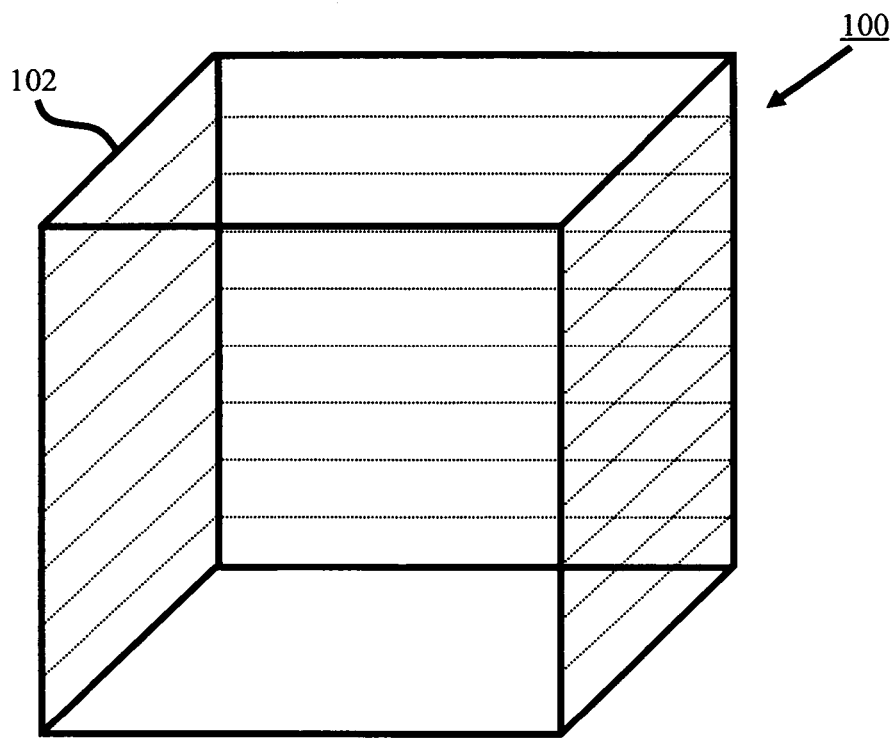
FIG. 1 is a perspective view of a grid with slices indicated by dashed lines on the Y-axis (voxels not shown)

A method, an apparatus, and a computer program product are disclosed for determining the bounding voxelization of a triangle represented in a three-demensional space. In the following description, numerous specific details, including programming languages, hardware description languages, are set forth. In this document, "a triangle's bounding voxelisation" means the process for identifying those voxels that, when geometrically expressed as a cube, intersect or are intersected by a triangle. This process may be expanded to other polygons. In case of a software implementation, the use of a CPU's division instructions typically incurs a significant time penalty as the instruction is computationally "expensive". In case of a hardware implementation (FPGA, ASIC), a division operation requires a considerable gate count to express its logic and likely requires a pipeline architecture to implement at sufficient throughput, further complicating its solutions and ultimately increasing cost. The embodiments of the invention advantageously provide an identifying process that can be used with a given triangle without using any division operations and therefore are well suited as implementations in the fields mentioned hereinbefore.

The method for determining the bounding voxelization of a triangle in three-dimensional space in accordance with the embodiments of the invention may be implemented in modules. A module, and in particular its functionality, can be implemented in either hardware or software. In the software sense, a module is a process, program, or portion thereof that performs a particular function or related functions. Such software may be implemented in C, C++, ADA, Fortran, for example, but may be implemented in any of a number of other programming languages/systems, or combinations thereof. In the hardware sense, a module is a functional hardware unit designed for use with other components or modules. For example, a module may be implemented using discrete electronic components, or it can form a portion of an entire electronic circuit such as a Field Programmable Gate Arrays (FPGA), Application Specific Integrated Circuit (ASIC), and the like. A physical implementation may also include configuration data for a FPGA, or a layout for an ASIC, for example. Still further, the description of a physical implementation may be in EDIF net listing language, structural VHDL, structural Verilog or the like. Numerous other possibilities exist. Those skilled in the art will appreciate that the system can also be implemented as a combination of hardware and software modules.

Overview

The basic principle of the invention exploits a definition of the edge of a triangle or other polygon (and trapezoid-like polygons defined within it in accordance with the invention) as a vector forming the denominator of a fraction in such a way that it will remain constant over the entirety of that edge. Doing so, as will be described in greater detail below, allows the intersected voxels to be found by incrementing along "Manhattan distances" (e.g. limiting incremental movements between voxels to orthogonal directions) corresponding to or approximating the vector such that the direction of each increment can be chosen by simple comparison of the numerators of fractions without actually performing and division operation. An incidental benefit of the technique in accordance with the invention is that many edges of polygons defined within the triangle or other polygon can be processed as a two-dimensional problem using a simplified algorithm, further enhancing speed of operation for a given level of available processing power. The direction of each incremental manhattan distance step is simply the direction of the smaller of two or the smallest of three numerators of fractions representing a digital differential analysis set up to define the bounding edge of a triangle or other polygon.

The embodiments of the invention provide a method that divides a triangle into a set of trapezoid-like polygonal shapes, where each trapezoid corresponds to an intersected "slice" of the grid. A slice of the grid refers to a single layer of voxels along a selected "slicing axis plane". The "slicing axis" corresponds to one of the primary axes (X, Y, Z) of the grid and is perpendicular to the slicing axis planes. For purposes of illustration only in the accompanying drawings, the slicing axis plane selected is the Y-axis. However, it will be apparent to those skilled in the art that any other axis could be used equally well. By the same token, a triangle is a preferred basic polygonal shape that affords increased generality and computational simplicity and efficiency as alluded to above, and the invention will be described with reference thereto both as being preferred and for purposes of conveying an understanding of the basic principles of the invention.

Figure 2:
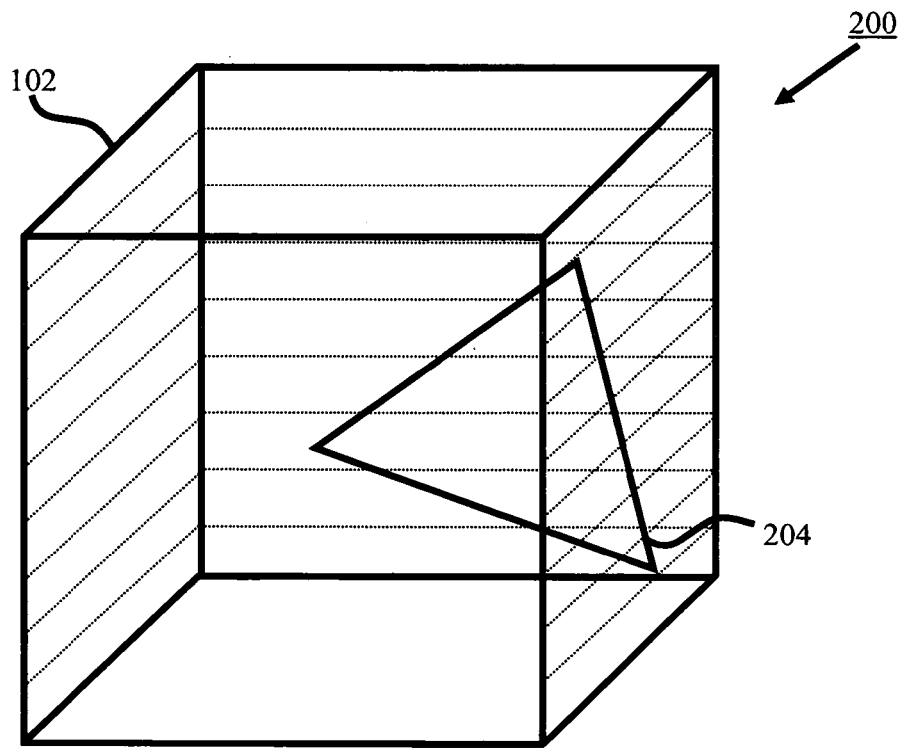
FIG. 2 is a perspective view of a grid containing an arbitrary triangle (voxels not shown)

FIG. 1 illustrates the configuration 100 of a grid 102, with slices on the Y-axis (i.e. the vertical axis in the drawing). The slices are denoted vertically by horizontal dotted lines. To simplify the drawing, voxels are not shown. FIG. 2 illustrates the configuration 200 corresponding to that of FIG. 1, but further containing an arbitrary triangle 204. Otherwise, like elements in FIGS. 1 and 2 have the same reference number.

Figure 3:
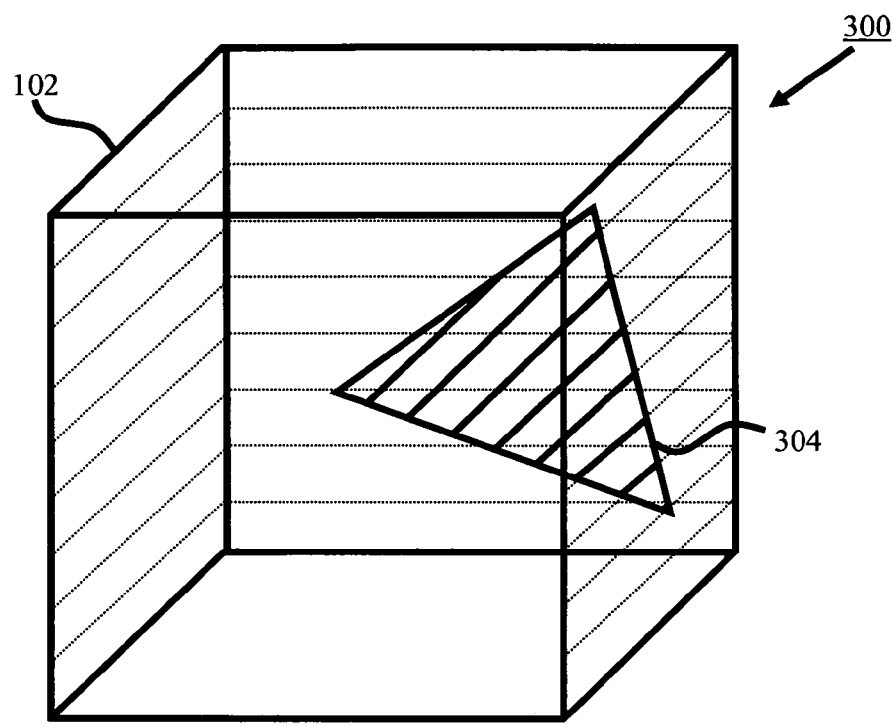
FIG. 3 is a perspective view of a grid containing an arbitrary triangle, where the triangle is separated into trapezoid-like polygons following intersection with slices of the grid on the Y-axis (voxels not shown)
Figure 4:
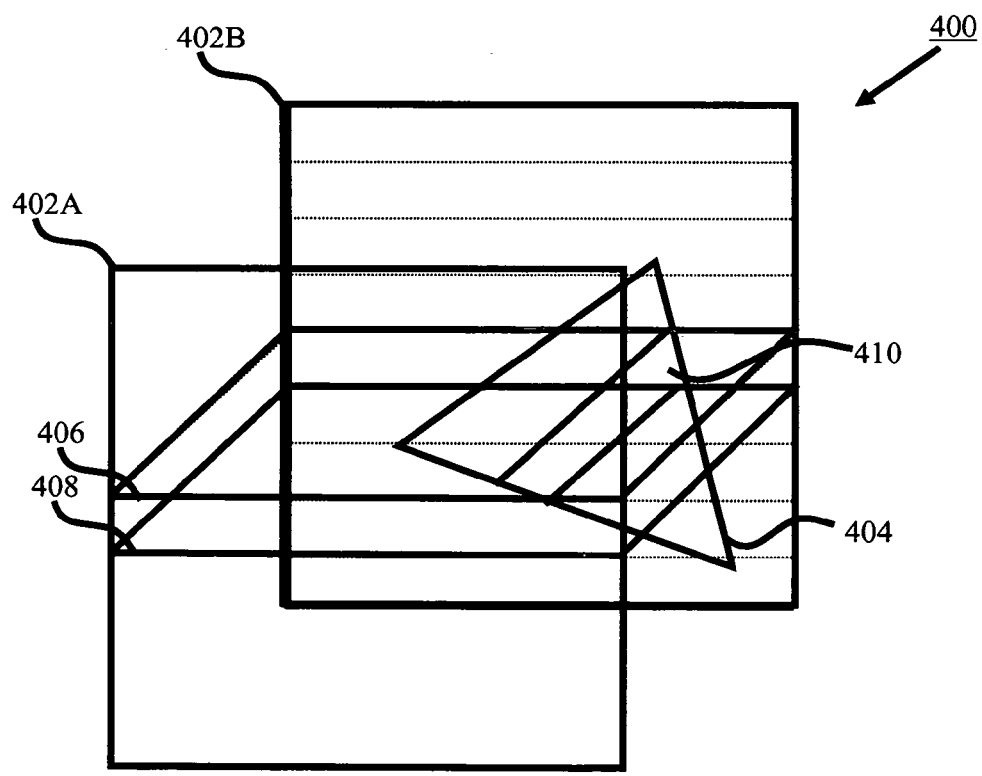
FIG. 4 is a perspective view emphasizing one trapezoid-like polygon with its corresponding grid slice, based on the grid depicted in FIG. 3.

FIG. 3 illustrates a configuration 300 corresponding largely to that 200 of FIG. 2, except that the triangle 304 is now separated out into several trapezoid-like polygons following intersection with slices of the grid 102 on the Y axis. FIG. 4 illustrates a partial grid 400, with front and rear faces 402A and 402B, containing an arbitrary triangle 404. The triangle 404 is now separated out into trapezoid-like polygons following intersection with the slices of the grid on the Y-axis. One trapezoid-like polygon 410 of the triangle is highlighted together with its corresponding grid slice denoted by planes 406 and 408.

Each individual trapezoid-like polygon is rasterized individually to determine the intersection of each edge with the voxels on the defined slice for the Y-axis position. An edge is a vector from one vertex of the triangle to another vertex of that triangle. This may be done using a derivative of the rasterizing method described in United Kingdom (GB) Patent Application No. 0304570.5 filed on 28 Feb. 2003 in the name of International Business Machines Corp and entitled a method of setting up multi-dimensional DDA variables, which is incorporated herein by reference. The set of voxels on the same Y-axis position found to be intersecting the edges of the trapezoid-like polygonal shape are then "interior-filled" by finding the minimum and maximum voxel positions along a secondary axis for a tertiary axis, thus forming strips of voxels that can be marked iteratively. For purposes of illustration only, the secondary axis may be the Z-axis, and the tertiary axis may be the X-axis. However, it will be apparent to those skilled in the art that any axis other than the slicing axis mentioned earlier (Y) may be used, in any order, as long as the secondary and tertiary axes are not the same.

Determining Bounding Voxelization

Figure 6:
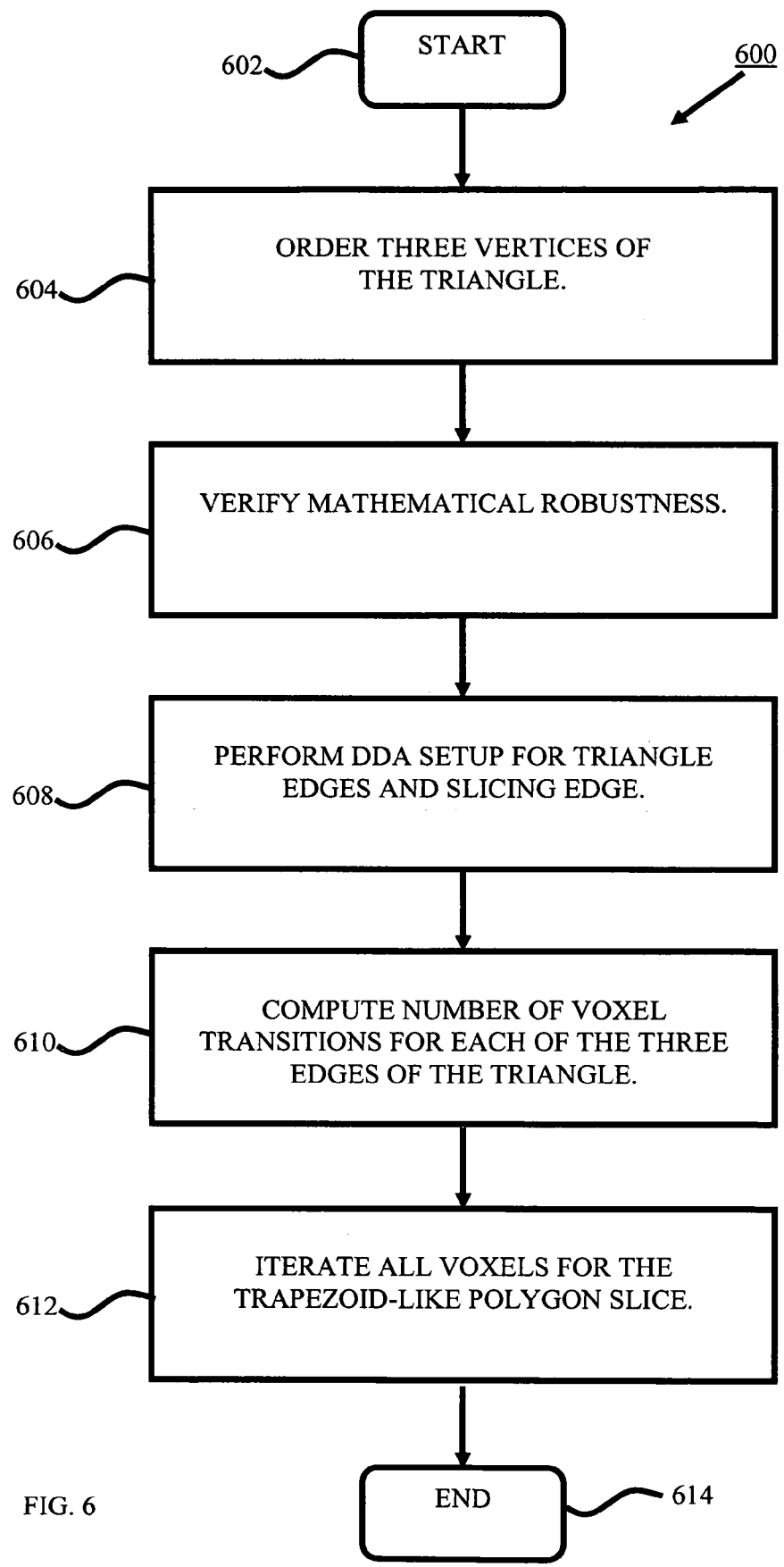
FIG. 6 is a flow diagram illustrating a method of determining the bounding voxelization of a 3D triangle.
Figure 7A:
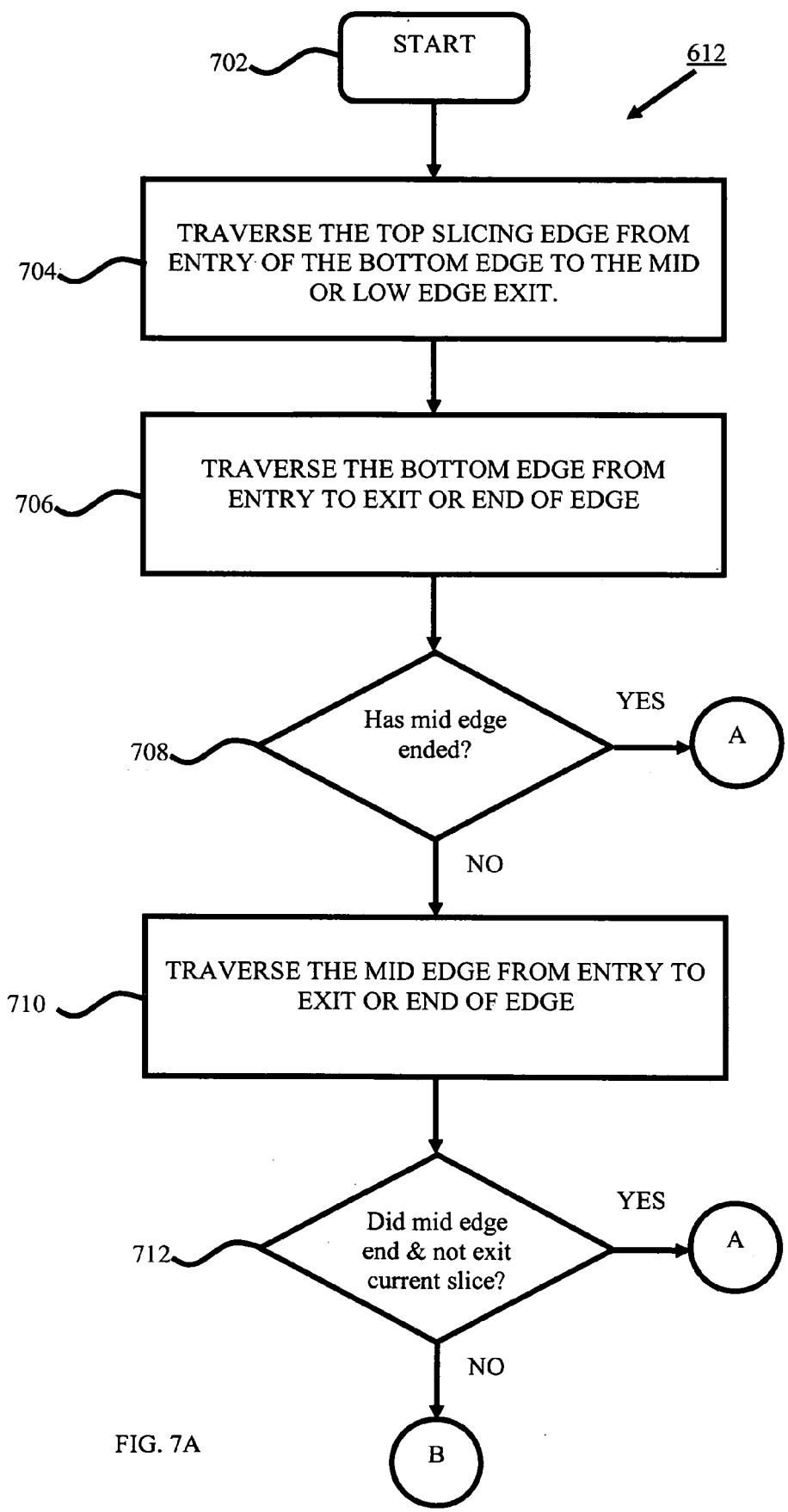
FIG. 7 is a flow diagram illustrating a sub-process of iterating all voxel transitions of FIG. 6.
Figure 7B:
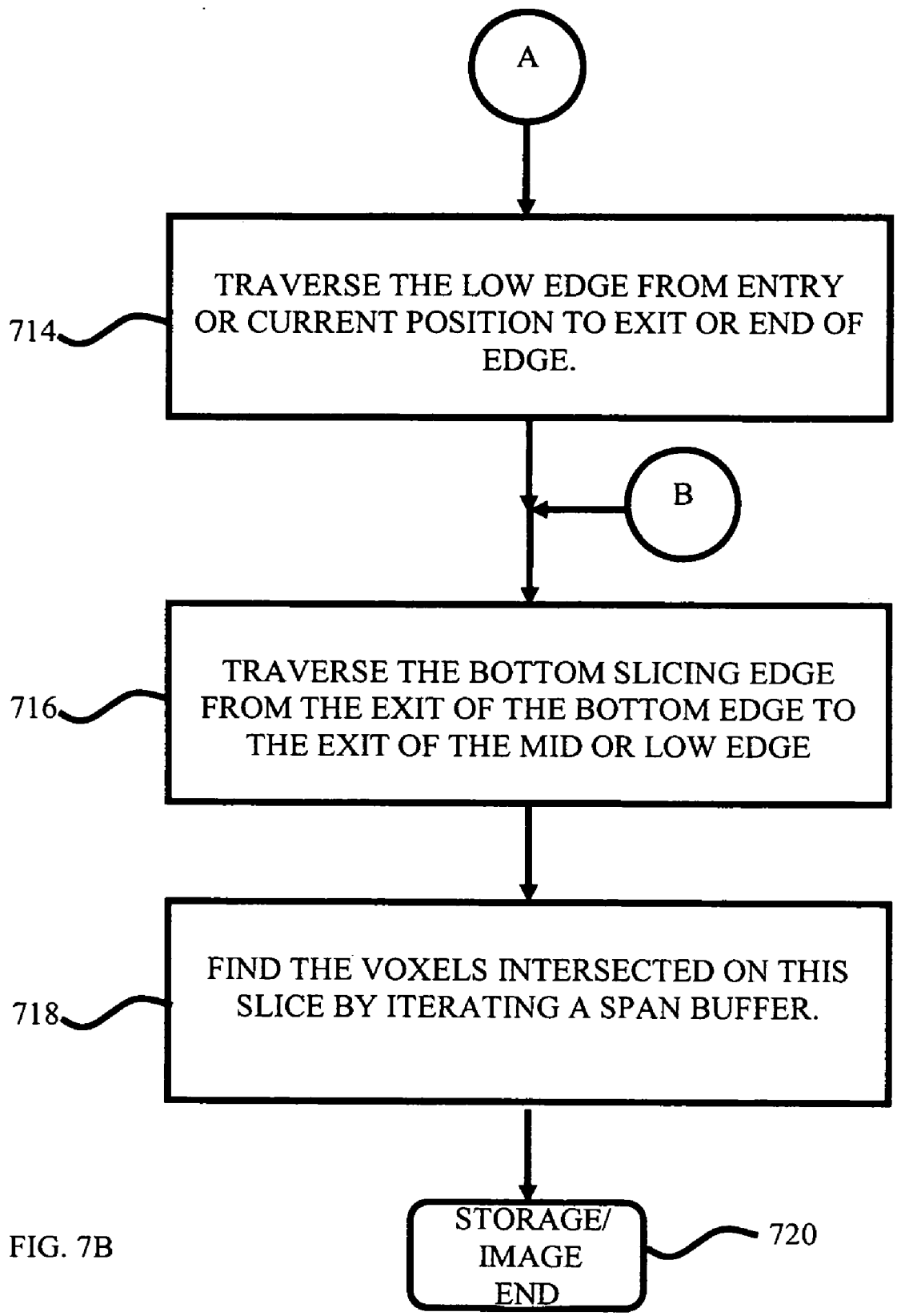

An overview of FIGS. 6 and 7 is given, followed by more detailed descriptions of each of the process steps in these drawings. FIG. 6 illustrates in greater detail the method 600 of determining the bounding voxelization of a 3D triangle. Processing commences in step 602. In step 604, the three vertices of the triangle are ordered. In step 606, the mathematical robustness of edge coordinates is verified. This accounts for values near zero, i.e., within a predefined tolerance, "epsilon", of zero. In step 608, DDA setup is performed for the triangle edges and the slicing edges. In step 610, the number of voxel transitions for each edge of the triangle is computed. In step 612, all voxels for the trapezoid-like polygon slice are iterated. This sequence is performed until the bottom edge of the triangle is processed and exits. Processing terminates in step 614.

The processing carried out in step 612 is depicted in greater detail in FIG. 7. Processing commences in step 702. In step 704, the top slicing edge is traversed from entry of the bottom edge to entry of the mid or low edge. In step 706, the bottom edge is traversed from entry to exit or end of the edge. In step 708, a check is made to determine if the mid edge has ended. If step 708 returns true (YES), processing continues at step 714. Otherwise, if step 708 returns false (NO), processing continues at step 710.

In step 710, the mid edge is traversed from entry to exit or end of the edge. Processing continues at step 712. In decision step 712, a check is made to determine if the mid edge ended and did not exit the current slice. If step 712 returns true (YES), processing continues at step 714. Otherwise, if step 712 returns false (NO), processing continues at step 716.

In step 714, the low edge is traversed from entry or current position to exit or end of edge. In step 716, the bottom slice edge is traversed from the exit of the bottom edge to the exit of the mid or low edge. In step 718, the voxels intersected on this slice are found by iterating the span buffer storing data for the span of an edge as will be discussed in greater detail below. The resulting values a stored or otherwise utilized to develop and store (or otherwise utilize) a data map of marked voxels in the grid and processing terminates in step 720. These steps will now be discussed in detail.

Ordering of Triangle Vertices

Regarding step 604 of FIG. 6, the three vertices of the triangle are ordered in a Top, Middle, and Bottom order. The processing order of the vertices may be arbitrary, e.g. where the mid vertex equals the bottom vertex. The Top vertex is the vertex with the lowest Y value (Y values, by convention for purposes of this discussion of the invention, increasing in the downward direction in the depictions of the grid in FIGS. 1–4), the Bottom vertex is the vertex with the highest Y value, and the Middle vertex is the one remaining after selection of the other two. Vertices with identical Y coordinates may be arbitrarily ordered.

Figure 5:
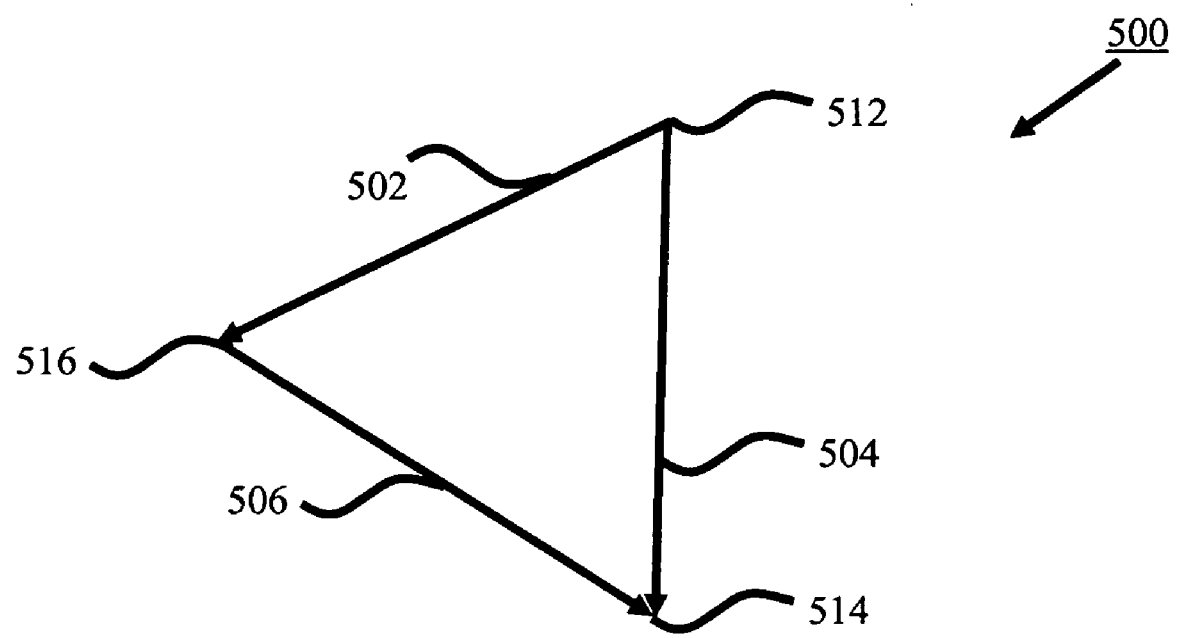
FIG. 5 is a plan view of a triangle illustrating the ordering of vertices and edge-naming conventions.

FIG. 5 illustrates the ordering of vertices and edge-naming conventions for a triangle 500. For purposes of this description, the positive Y-axis is pointed downwards. The triangle 500 has three vertices 512, 516, and 514. In this example, the Top vertex $\bar{t}$ is the vertex 512, the Bottom vertex $\bar{b}$ is the vertex 514, and the Middle vertex $\bar{m}$ is the vertex 516. An edge 502 extends between the vertices 512 and 516, another edge 504 extends between the vertices 512 and 514, and still another edge 506 extends between the vertices 516 and 514. The details of these edges are set forth in greater detail hereinafter.

Verify Mathematical Robustness

Again, an edge is the vector from a vertex to another vertex. Regarding step 606 of FIG. 6, each coordinate of the triangle's three edges is verified for its closeness to the value 0. If the coordinate value is within a specified interval [−epsilon . . . +epsilon] near zero, the coordinate value is considered 0. Epsilon is a value very close to zero, e.g. $10^{-5}$, but may vary dependent on the values to be put through the algorithm. Edge coordinates with a zero value have degenerate DDA operations of a lower dimension. This is described in United Kingdom (GB) Patent Application No. No. 0304570.5 filed on 28 Feb. 2003 in the name of International Business Machines Corp and entitled a method of setting up multi-dimensional DDA variables, which is incorporated herein by reference. Those skilled in the art will understand where these degenerate cases apply in the discussion hereinafter. Such degenerate cases are described in the above United Kingdom (GB) Patent Application.

Perform DDA Setup for Triangle and Slicing Edges

Regarding step 608, the DDA variable setup process of United Kingdom (GB) Patent Application No. No. 0304570.5 filed on 28 Feb. 2003 in the name of International Business Machines Corp and entitled a method of setting up multi-dimensional DDA variables, may be used to initialize the DDA Variables for the Mid Edge $\bar{p}$, the Bottom Edge $\bar{r}$ and the Low Edge $\bar{q}$ (corresponding to edges 506, 504, and 502 in FIG. 5, respectively). The Mid, Low and Bottom edge denominators are setup from Top Vertex $\bar{t}$, Middle Vertex $\bar{m}$, and Bottom Vertex $\bar{b}$. As disclosed in the above-incorporated application, the denominator of a vector is given as follows:

$$Den(\bar{v}) = \begin{pmatrix} v_y \cdot v_z \\ v_x \cdot v_z \\ v_x \cdot v_y \end{pmatrix}, \quad (1),$$

where $v_x$, $v_y$, and $v_z$ are the X, Y, and Z components of the vector $\bar{v}$. This equation follows the above-incorporated application and builds the variables for digital differential analysis (DDA). Such a DDA steup consists of a numerator and a denominator.

Denominator and numerator vectors for any given vector $\bar{v}$ are specified hereinafter, namely for the middle edge, low edge, and bottom edge as follows:

$$MidEdge = \bar{p} = \bar{m} - \bar{t}, \quad (2)$$

where $\bar{m}$ and $\bar{t}$ are the middle and top vertices. For the invention, it is necessary to trace edges of a triangle. (The nomenclature of the top, middle and bottom edges is discussed in connection with FIG. 5.) This equation merely determines the vector direction from $\bar{t}$ pointing toward $\bar{m}$.

Using Equation (1), the denominator of the MidEdge $\bar{p}$ is:

$$MidEdgeDen = Den(\bar{p}) = \begin{pmatrix} p_y \cdot p_z \\ p_x \cdot p_z \\ p_x \cdot p_y \end{pmatrix}. \quad (3)$$

This equation applies the function defined in equation (1) for the vector computed in equation (2) to set up the denominator for the DDA of the middle edge.

The numerator of the MidEdge $\bar{p}$ is:

$$MidEdgeNum = Num(\bar{t}, \bar{m}) \quad (4)$$

$$= \begin{pmatrix} (t_x > m_z \rightarrow Den(\bar{p})_x \cdot (t_x - \lfloor t_x \rfloor), T \rightarrow Den(\bar{p})_x \cdot (\lfloor 1 + t_x \rfloor - t_x)) \\ (t_y > m_y \rightarrow Den(\bar{p})_y \cdot (t_y - \lfloor t_y \rfloor), T \rightarrow Den(\bar{p})_y \cdot (\lfloor 1 + t_y \rfloor - t_y)) \\ (t_z > m_z \rightarrow Den(\bar{p})_z \cdot (t_z - \lfloor t_z \rfloor), T \rightarrow Den(\bar{p})_z \cdot (\lfloor 1 + t_z \rfloor - t_z)) \end{pmatrix} \quad (4)$$

The numerator can be considered or visualized as how far along each of the axes the stepping position is. That is, $\bar{t}$ and $\bar{m}$ refer to the original top and middle vertices, respectively and the arrow (−>) is a notation for a conditional expression such that, for example, in "a>b-->A, T-->B"

would return A if a>b is true or otherwise would return B. The vertical lines with angled bottoms are floor or truncation operators (e.g. the floor of 2.4 would be 2).

In a similar fashion, the denominators and numerators of LowEdge and BottomEdge are setup as:

$$LowEdge = \bar{q} = \bar{b} - \bar{m}, \quad (5)$$

$$LowEdgeDen = Den(\bar{p}) = \begin{pmatrix} q_y \cdot q_z \\ q_x \cdot q_z \\ q_x \cdot q_y \end{pmatrix}, \quad (6)$$

$$LowEdgeNum = Num(\bar{m}, \bar{b}) \quad (7)$$

$$= \begin{pmatrix} (m_x > b_z \rightarrow Den(\bar{q})_x \cdot (m_x - \lfloor m_x \rfloor), T \rightarrow Den(\bar{q})_x \cdot (\lfloor 1 + m_x \rfloor - m_x)) \\ (m_y > b_y \rightarrow Den(\bar{q})_y \cdot (m_y - \lfloor m_y \rfloor), T \rightarrow Den(\bar{q})_y \cdot (\lfloor 1 + m_y \rfloor - m_y)) \\ (m_z > b_z \rightarrow Den(\bar{q})_z \cdot (m_z - \lfloor m_z \rfloor), T \rightarrow Den(\bar{q})_z \cdot (\lfloor 1 + m_z \rfloor - m_z)) \end{pmatrix}, \quad (7)$$

-continued $$BottomEdge = \bar{r} = \bar{b} - \bar{t}, \quad (8) \tag{8}$$

$$BottomEdgeDen(\bar{r}) = \left( \begin{array}{c} |r_y \cdot r_z| \\ |r_x \cdot z_z| \\ |r_x \cdot r_y| \end{array} \right), \tag{9}$$

$$BottomEdgeNum = \text{Num}(\bar{t}, \bar{b})$$

$$= \left( \begin{array}{l} (t_x > b_z \rightarrow \text{Den}(\bar{r})_x \cdot (t_x - \lfloor t_x \rfloor), T \rightarrow \text{Den}(\bar{r})_x \cdot (\lfloor 1 + t_x \rfloor - t_x)) \\ (t_y > b_y \rightarrow \text{Den}(\bar{r})_y \cdot (t_y - \lfloor t_y \rfloor), T \rightarrow \text{Den}(\bar{r})_y \cdot (\lfloor 1 + t_y \rfloor - t_y)) \\ (t_z > b_z \rightarrow \text{Den}(\bar{r})_z \cdot (t_z - \lfloor t_z \rfloor), T \rightarrow \text{Den}(\bar{r})_z \cdot (\lfloor 1 + t_z \rfloor - t_z)) \end{array} \right) \tag{10}$$

These equations (5)–(7) and (8)–(10) are analogous to equations (2)–(4) for LowEdge and BottomEdge, respectively.

The slicing vector is the two-dimensional (e.g. in two dimensions) vector describing the intersection between the slicing plane (which is the plane perpendicular to the slicing (Y) axis) and the plane of the triangle. Furthermore, the slicing vector is defined to be pointing toward the intersection of the Mid Edge or the Low Edge with the slicing plane, if originating from the Bottom Edge.

The slicing vector, and importantly its denominator value, is computed as follows:

$$TriangleNormal = \bar{n} = \left( \begin{array}{c} p_y \cdot r_x - p_z \cdot r_y \\ p_x \cdot r_z - p_z \cdot r_x \\ p_x \cdot r_y - p_y \cdot r_x \end{array} \right), \tag{11}$$

$$SliceEdge = \bar{s} = \left( \begin{array}{c} n_z \\ -n_x \end{array} \right), \tag{12}$$

Equation (12) determines the direction of the edge formed by the intersection of the triangle with the slicing plane which is the plane which, in FIGS. 3 and 4, intersects the triangle and produces the slabs of the grid. In the equation, the slicing plane is defined as the Y plane. Consequently, the 2D slicing edge consists of X and Z components (since it is flat in Y and not 3D). The vector made of the X and Z components is then rotated 90° to coincide with the edge rather than being perpendicular to it.

$$SliceDir = \left( \begin{array}{l} s_x \geq 0 \rightarrow 1, T \rightarrow -1 \\ s_z \geq 0 \rightarrow 1, T \rightarrow -1 \end{array} \right), \tag{13}$$

SliceDir is a vector used for stepping through the discrete coordinates or voxel locations of the grid. Consequently, if the SliceEdge, s, is positive on the X axis, the value will be 1 (e.g. one step in the positive direction) and if s is negative the value will be −1 (one step in the negative direction). The same applies to the Z axis, as well. Thar is, if $s_x$ is greater than or equal to zero, then the SliceDir is 1; otherwise, the SliceDir is −1. The same applies in respect of $s_z$.

The DDA denominator for the slice edge is computed as:

$$SliceEdgeDen = Den(\bar{s}) \cdot BottomEdgeDen_x \cdot BottomEdgeDen_z, \tag{14}$$

$$= \left( \begin{array}{c} |-n_x| \\ |n_z| \end{array} \right) \cdot BottomEdgeDen_x \cdot BottomEdgeDen_x,$$

$$= \left( \begin{array}{l} |p_x \cdot r_y - p_y \cdot r_x| \cdot BottomEdgeDen_x \cdot BottomEdgeDen_z \\ |p_x \cdot r_y - p_y \cdot r_x| \cdot BottomEdgeDen_x \cdot BottomEdgeDen_z \end{array} \right). \tag{14}$$

For computation of SliceEdgeDen, if the BottomEdge is axis aligned (i.e., one of the edge's coordinates is within Epsilon of 0), its corresponding BottomEdgeDen coordinate is not included in the above Equation (14). The numerator for the slicing edge is computed during slice iteration (see Equation (27)).

Compute Number of Voxel Transitions for Each Triangle Edge

Figure 8:
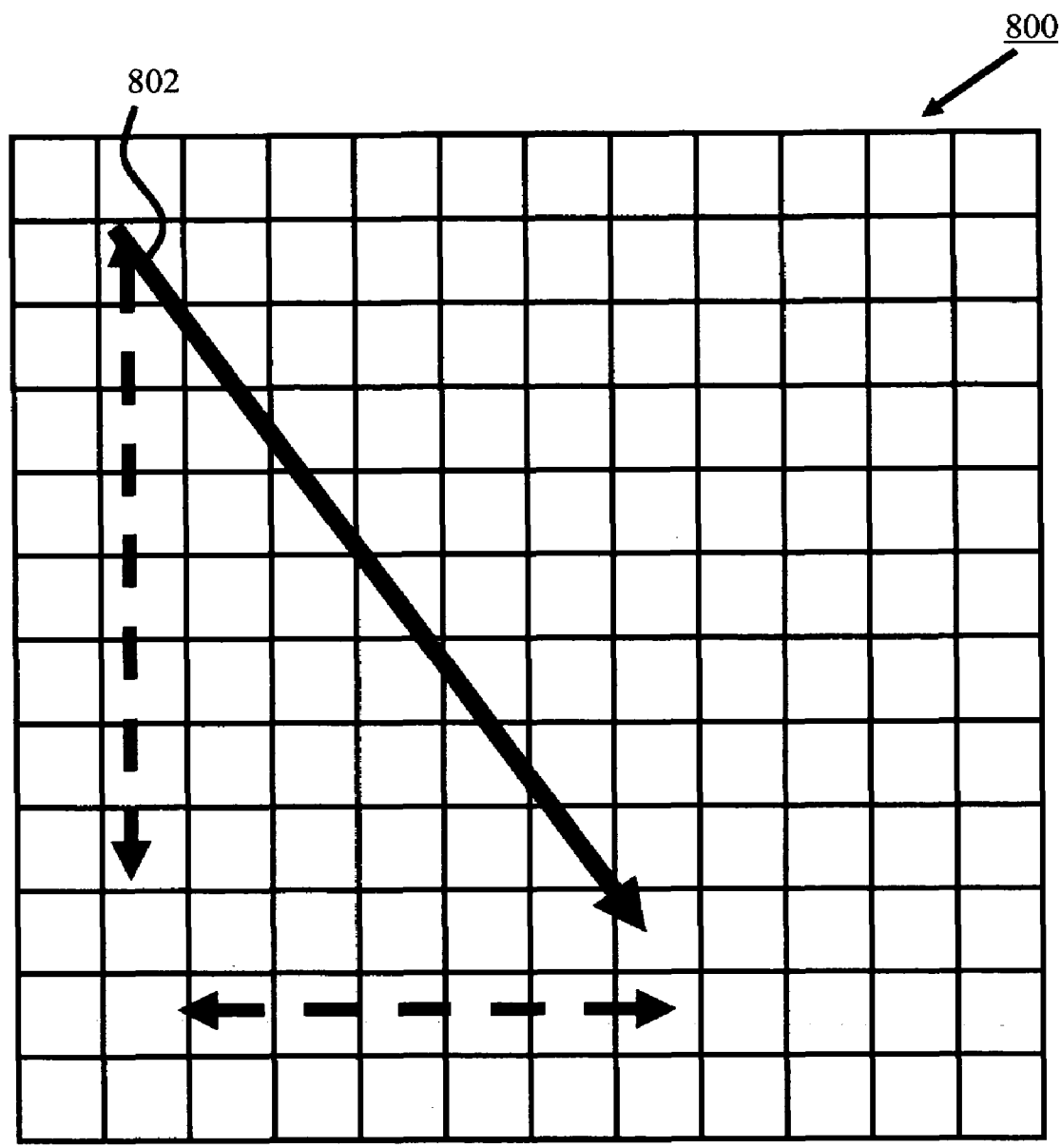
FIG. 8 is a 2D plan view of a ray passing through an array of voxels.
Figure 9:
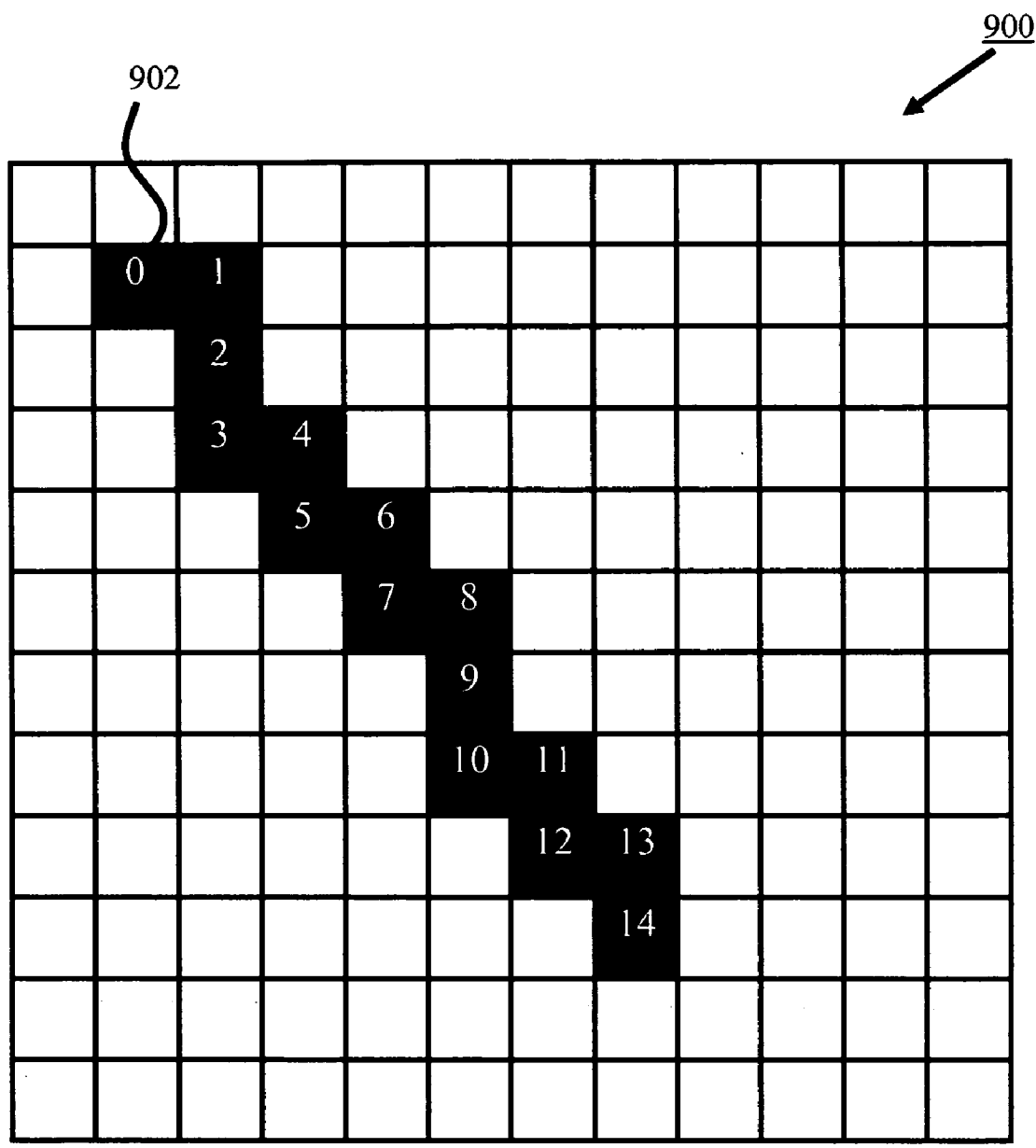
FIG. 9 is a 2D plan view illustrating the voxels intersected by the ray of FIG. 8.

FIG. 8 depicts an edge relative to voxels in an XZ plane. FIG. 9 shows the voxels 0–14 spanned by the edge. Visualization of how the number of transitions (movements from one voxel to another) is determined as the sum of the horizontal and vertical voxel distances:

$$VoxelDist(\bar{f},\bar{t}) = \lfloor f_x \rfloor - \lfloor t_x \rfloor + \lfloor f_y \rfloor - \lfloor t_y \rfloor + \lfloor f_z \rfloor - \lfloor t_z \rfloor, \tag{15}$$

which returns the voxel distance for an edge from a "from" vector f to a "to" vector t. VoxelDist is a function that produces the Manhattan distance in the 3D voxel grid between two positions as is discussed in connection with FIGS. 8 and 9.

This function can be used to compute the distance values for the three edges of the triangle, if given the Top vertex $\bar{t}$, Middle vertex $\bar{m}$, and Bottom vertex $\bar{b}$, as follows:

$$\text{MidDist}=\text{VoxelDist}(\bar{t},\bar{m})=|\lfloor t_x\rfloor-\lfloor m_x\rfloor|+|\lfloor t_y\rfloor-\lfloor m_y\rfloor|+|\lfloor t_z\rfloor-\lfloor m_z\rfloor|, \quad (16)$$

$$\text{LowDist}=\text{VoxelDist}(\bar{m},\bar{b})=|\lfloor m_x\rfloor-\lfloor b_x\rfloor|+|\lfloor m_y\rfloor-\lfloor b_y\rfloor|+|\lfloor m_z\rfloor-\lfloor b_z\rfloor|, \quad (17)$$

$$\text{BottomDist}=\text{VoxelDist}(\bar{t},\bar{b})=|\lfloor t_x\rfloor-\lfloor b_x\rfloor|+|\lfloor t_y\rfloor-\lfloor b_y\rfloor|+|\lfloor t_z\rfloor-\lfloor b_z\rfloor|. \quad (18)$$

These equations are also used to determine when the processing is complete.

In addition, the integer MidDir, LowDir, and BottomDir vectors indicate the stepping direction for the DDA used later. The following integer values are computed:

$$MidDir = \begin{pmatrix} (t_x \geq m_x \to -1, T \to 1) \\ (t_y \geq m_y \to -1, T \to 1) \\ (t_z \geq m_z \to -1, T \to 1) \end{pmatrix}, \quad (19)$$

$$LowDir = \begin{pmatrix} (m_x \geq b_x \to -1, T \to 1) \\ (m_y \geq b_y \to -1, T \to 1) \\ (m_z \geq b_z \to -1, T \to 1) \end{pmatrix}, \quad (20)$$

$$BottomDir = \begin{pmatrix} (t_x \geq b_x \to -1, T \to 1) \\ (t_y \geq b_y \to -1, T \to 1) \\ (t_z \geq b_z \to -1, T \to 1) \end{pmatrix}, \quad (21)$$

These Equations produce direction vectors (as outlined at Equation (13)) for the slicing edge for the middle, low and bottom edges respectively.

$$\text{Primary}_x = \text{Secondary}_x = \lfloor t_x \rfloor, \quad (22)$$

$$\text{Primary}_z = \text{Secondary}_z = \lfloor t_z \rfloor, \quad (23)$$

$$\text{CurrentYSlice} = \lfloor t_y \rfloor, \quad (24)$$

These equations set up the discrete start coordinates.

Primary coordinates indicate the XZ location on the current Y-plane for the BottomEdge during the core loop. Secondary coordinates start out as the XZ location on the current Y-plane for the MidEdge during the core loop, until the MidEdge ends and becomes the LowEdge (see FIG. 5), when it continues to traverse the LowEdge. The CurrentYSlice indicates the highest (lowest Y-value) vertex of the triangle, where processing starts.

Iterate Voxel Transitions

The variables MidDist, LowDist and BottomDist hold the distance specified minus the number of voxel transitions on their respective edges. In other words, the variables hold the number of transitions that are still to be performed.

While there are voxel transitions to be performed, i.e., while (MidDist>0 or LowDist>0, or BottomDist>0) is true, the upper slicing edge, the primary (bottom-) edge and the secondary (mid- followed by the low-) edge, and finally the lower slicing edge, have their voxel transitions performed for each YSlice, followed by the conversion of the span buffer data to actual voxel locations. These steps are described hereinafter:

Upper Slicing Edge

The DDA run for the Upper Slicing edge is two-dimensional and runs across the slice's XZ plane from the Primary to Secondary position. Consequently, the slicing edge's starting position is initialized with the Primary position:

$$\text{SlicePos=Primary}$$

First the Distance of the current Upper Slicing edge is determined from Primary and Secondary positions:

$$\text{SliceDist}=|\text{Primary}_x-\text{Secondary}_x|+|\text{Primary}_z-\text{Secondary}_z|. \quad (25)$$

This computes the Manhattan distance for a single slice run.

Finally, the DDA numerator values for the current top slicing edge are determined from the current numerator values of the bottom edge (as the bottom edge corresponds to the Primary position):

$$PartialSliceNum = \begin{pmatrix} (SliceDir_x = BottomDir_x \to BottomNum_x, T \to BottomDen_x - BottomNum_x) \\ (SliceDir_z = BottomDir_z \to BottomNum_z, T \to BottomDen_z - BottomNum_z) \end{pmatrix}, \quad (26)$$

$$SliceNum = \begin{pmatrix} PartialSliceNum_z \cdot SliceEdge_z \cdot BottomDen_z \\ PartialSliceNum_x \cdot SliceEdge_x \cdot BottomDen_x \end{pmatrix}. \quad (27)$$

These equations set up a DDA numerator for a single slice run. It should be noted that since a numerator describes the position within a voxel expressed as a fraction of the denominator, the numerator varies with position.

Table 1 contains pseudo-code that performs the actual iteration:

TABLE 1

```
While (SliceDist > 0) Do
    SliceDist = SliceDist - 1
    If  SliceNum.X < SliceNum.Z Then
        SliceNum.Z = SliceNum.Z - SliceNum.X
        SlicePos.X = SlicePos.X + SliceDir.X
        SliceNum.X = SliceDen.Z
    Else
        SliceNum.X = SliceNum.X - SliceNum.Z
        SlicePos.Z = SlicePos.Z + SliceDir.Z
        SliceNum.Z = SliceDen.Z
End while
```

The processing in the pseudocode contained in Table I is iterated while the SliceDist is greater than zero. In the iteration, the SliceDist is decremented by 1. If the X component of the Slice numerator is less than the Z component, the Z component of the slice numerator is decreased by the value of the X component of the slice numerator. The X component of the slice position is incremented by the value of the X component of the slice direction. The X component of the slice numerator is set equal to the Z component of the slice denominator. Otherwise, if the X component of the slice numerator is greater than or equal to the Z component, then the same type of processing is carried out but the X and Z components are substituted for each other relative to the case when the X component of the slice numerator is less than the Z component.

The MarkSpanBuffer function updates the spanbuffer to indicate the edge, and is described in more detail below.

Bottom Edge

Table 2 contains pseudocode that is iterated for the Bottom Edge.

TABLE 2

```
If (BottomDist > 0) then
    Do
        BottomDist = BottomDist - 1
        If BottomNum.Z < BottomNum.Y Then
            If BottomNum.Z < BottomNum.X Then
                BottomNum.X = BottomNum.X - BottomNum.Z
                BottomNum.Y = BottomNum.Y - BottomNum.Z
                BottomNum.Z = BottomDen.Z
                Primary.Z = Primary.Z + BottomDir.Z
            Else
                BottomNum.Y = BottomNum.Y - BottomNum.X
                BottomNum.Z = BottomNum.Z - BottomNum.X
                BottomNum.X = BottomDen.X
                Primary.X = Primary.X + BottomDir.X
            End if
        Else
            If BottomNum.Z < BottomNum.Y Then
                BottomNum.X = BottomNum.X - BottomNum.Z
                BottomNum.Y = BottomNum.Y - BottomNum.Z
                BottomNum.Z = BottomDen.Z
                Primary.Z = Primary.Z + BottomDir.Z
            Else
                BottomNum.X = BottomNum.X - BottomNum.Y
                BottomNum. = BottomNum.Z - BottomNum.Y
                BottomNum.Y = BottomDen.Y
                Last transition is on Y
            End if
        End if
        MarkSpanBuffer (Primary)
    While BottomDist > 0 And Last Transition was not on Y
End if
```

If BottomDist is larger than zero, then the following process is iteratively performed. BottomDist is decremented by one, By comparing components of the Bottom Numerator, the smallest of the three components (X, Y or Z) is established. If X is the smallest component, the X component is subtracted from the Z component of the Bottom Numerator. The X component of the bottom numerator is set equal to the X component of the Bottom Denominator. The X component of the Primary position is then incremented with the X component of the BottomDir. If Z is the smallest component, then the same type of process is executed relative to the case where X was the smallest Bottom Numerator component but the X and Z components are substituted for each other. If Y is the smallest component, the Y component is subtracted from the X component of the Bottom Numerator and the Y component of the Bottom Numerator is subtracted from the Z component of the Bottom Numerator. The Y component of the Bottom Numerator is set equal to the Y component of the Bottom Denominator. If Y is the smallest component, the process exits on Y (since a transition in the Y direction traverses the slice). Following the above for X, Y or Z, the spanbuffer is marked with the Primary Position as updated. The aforementioned steps are repeated if BottomDist is greeater than 0 and the last transition was not on Y (i.e. Y was not the smallest numnerator component that was not exited on Y).

The pseudocode of Table 2 is based on a process in UK Patent Application No. 0304570.5 with only slight modifications. For sake of clarity, the degenerate cases have not been illustrated, but will be evident to those skilled in the art and, in any event, are identical to those in UK Patent Application No. 0304570.5 in that the lower dimension equivalent process is executed.

Mid Edge

The MidEdge is handled identically to the BottomEdge, using the corresponding MidEdge variables and the Secondary instead of the Primary variables. The processing is identical with one notable difference during Y transitions, where the processing prevents the LowEdge from being voxelized for the prior Y slice as denoted in decision step 712.

Low Edge

If the MidEdge has finished (MidDist=0), the LowEdge is voxelized. Should the MidEdge's last transition be on Y, the LowEdge is not voxelized for the current Yslice, but for the next. This corresponds to decision step 712. The process by which the LowEdge is voxelized is identical to that of the preceding description for the BottomEdge, except the process uses the corresponding MidEdge variables and the Secondary instead of the Primary position.

Lower Slicing Edge

The Lower Slicing Edge voxelisation traces the intersecting voxels at the bottom intersection of the YSlice. This process is identical to that of the Upper Slicing Edge using the updated variables following the BottomEdge, MidEdge and LowEdge voxelisations.

Iterate YSlice Span Buffer

The span buffer comprises an array of minimum and maximum values for each row of voxels in a YSlice. The span buffer is indexed by the z coordinate and returns x minima and maxima. Prior to the execution of the triangle algorithm of FIG. 6, all minima are initialized to an infinitely large number, and all maxima are initialized to an infinitely small number. The MarkSpanBuffer function performs the following operation set out in Table 3.

TABLE 3

```
Function MarkSpanBuffer (pos)
    If     (pos.Z >= 0) and (pos.Z < Maximum Grid Z Size) then
    SpanBuffer [pos.Z] .min = min (SpanBuffer [pos.z] .min, pos.x);
    SpanBuffer [pos.Z] .max = max (SpanBuffer [pos.z] .max, pos.x);
    End if
End function
```

In Table 3, min(a,b) is a function returning the lowest numerical value of a and b, and max(a,b) is a function returning the highest numerical value of a and b. Finally, each voxel intersected on the current Yslice can be iterated, by iterating all values in the span buffer using the pseudocode in Table 4.

TABLE 4

```
For Z is 0 to MaximumGridSize - 1
    X = SpanBuffer[Z] .min
```

TABLE 4-continued

```
While not (X > SpanBuffer[Z] . max) do
    VisitVoxel (X, CurrentYSlice, Z)
End while
SpanBuffer [Z] .min = Infinitely large
SpanBuffer [Z] .max = Infinitely small
End for
```

In Table 4, Visitvoxel is a function that performs the desired operation on intersected voxels. In a ray-tracing application, this would typically be adding the triangle being voxelised to a list for this voxel, such that a ray passing through this voxel can be intersection-tested with the triangle.

Following this, CurrentYSlice is updated:

CurrentYSlice=CurrentYSlice+1 and the loop continues at Section "Iterate Voxel Transitions" as described above.

Computer Implementation

The embodiments of the invention are preferably implemented using a computer. In particular, the processing or functionality described above and depicted in FIGS. 1–9 can be implemented as software, or a computer program, executing on the computer. The method or process steps disclosed for determining the bounding voxelization of a triangle represented in a 3D space are effected by instructions in the software that are carried out by the computer. The software may be implemented as one or more modules for implementing the process steps. A module is a part of a computer program that usually performs a particular function or related functions. Also, a module can also be a packaged functional hardware unit for use with other components or modules.

In particular, the software may be stored in a computer readable medium, including the storage devices described hereinafter. The software is preferably loaded into the computer from the computer readable medium and then carried out by the computer. A computer program product includes a computer readable medium having such software or a computer program recorded on the medium that can be carried out by a computer. The use of the computer program product in the computer preferably affects an advantageous apparatus for determining the bounding voxelization of a triangle represented in a three dimensional space in accordance with the embodiments of the invention.

The computer system may include a computer, a video display, and input devices. For example, an operator can use a keyboard and/or a pointing device such as the mouse to provide input to the computer as the input devices. In addition, the computer system can have any of a number of other output devices including line printers, laser printers, plotters, and other reproduction devices connected to the computer. The computer system can be connected to one or more other computers via a communication interface using an appropriate communication channel such as a modem communications path, a computer network, or the like. The computer network may include a local area network (LAN), a wide area network (WAN), an Intranet, and/or the Internet.

The computer may include a central processing unit(s) (simply referred to as a processor hereinafter), a memory which may include random access memory (RAM) and read-only memory (ROM), input/output (IO) interfaces, a video interface, and one or more storage devices. The storage device(s) may include one or more of the following: a floppy disc, a hard disc drive, a magneto-optical disc drive, CD-ROM, DVD, magnetic tape or any other of a number of non-volatile storage devices well known to those skilled in the art. Each of the components of the computer is typically connected to one or more of the other devices via a bus that in turn can consist of data, address, and control buses.

The above computer system is simply provided for illustrative purposes and other configurations can be employed without departing from the scope and spirit of the invention. Computers with which the embodiment can be practiced include IBM-PC/ATs or compatibles, one of the Macintosh (TM) family of PCs, Sun Sparcstation (TM), a workstation or the like. The foregoing are merely examples of the types of computers with which the embodiments of the invention may be practiced. Typically, the processes of the embodiments, described hereinafter, are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely an example of relevant computer readable mediums. Other computer readable mediums may be practiced without departing from the scope and spirit of the invention.

The invention claimed is:

1. A method for determining the bounding voxelization of a triangle represented in a three dimensional space to be represented in a grid, said method comprising the steps of:
   dividing a triangle into a plurality of polygons, each being an intersected slice of a grid;
   rasterizing each polygon individually to determine an intersection of each edge with voxels on the defined slice for a given axis position;
   marking strips of said voxels iteratively using minimum and maximum voxel positions along a secondary axis for a tertiary axis.

2. The method according to claim 1, wherein at least one of said polygons is trapezoid-like.

3. The method according to claim 1, further comprising the step of ordering the three vertices of said triangle.

4. The method according to claim 3, further comprising the step of verifying each coordinate of the three edges of said triangle for mathematical robustness.

5. The method according to claim 4, further comprising the step of performing DDA setup for the edges of said triangle and a slicing edge.

6. The method according to claim 5, further comprising the step of computing the number of voxel transitions for each of the three edges of said triangle.

7. The method according to claim 6, further comprising the step of iterating all voxels for the trapezoid-like polygon slice.

8. An apparatus for determining the bounding voxelization of a triangle represented in a three dimensional space to be represented in a grid, said apparatus comprising:

means for dividing a triangle into a plurality of polygons, each being an intersected slice of a grid;

means for rasterizing each polygon individually to determine an intersection of each edge with voxels on the defined slice for a given axis position; and means for marking strips of said voxels iteratively using minimum and maximum voxel positions along a secondary axis for a tertiary axis.

9. The apparatus according to claim 8, wherein at least one of said polygons is trapezoid-like.

10. The apparatus according to claim 8, further comprising means for ordering the three vertices of said triangle.

11. The apparatus according to claim 10, further comprising means for verifying each coordinate of the three edges of said triangle for mathematical robustness.

12. The apparatus according to claim 11, further comprising means for performing DDA setup for the edges of said triangle and a slicing edge.

13. The apparatus according to claim 12, further comprising means for computing the number of voxel transitions for each of the three edges of said triangle.

14. The apparatus according to claim 13, further comprising means for iterating all voxels for the trapezoid-like polygon slice.

15. A computer program product directly loadable into the internal memory of a digital computer, comprising software code portions for performing, when said product is run on a computer, steps of dividing a triangle to be represented in a grid into a plurality of polygons, each being an intersected slice of a grid;

rasterizing each polygon individually to determine an intersection of each edge with voxels on the slice of the grid for a given axis position; and marking strips of said voxels iteratively using minimum and maximum voxel positions along a secondary axis for a tertiary axis.

16. The computer program product according to claim 15, further comprising software for performing the step of ordering the three vertices of said triangle.

17. The computer program product according to claim 16, further comprising software for performing the step of verifying each coordinate of the three edges of said triangle for mathematical robustness.

18. The computer program product according to claim 17, further comprising software for performing the step of performing DDA setup for the edges of said triangle and a slicing edge.

19. The computer program product according to claim 18, further comprising software for performing the step of computing the number of voxel transitions for each of the three edges of said triangle.

20. The computer program product according to claim 19, further comprising software for performing the step of iterating all voxels for the trapezoid-like polygon slice.

* * * * *